US005953740A

United States Patent [19]

King et al.

[11] Patent Number: 5,953,740

[45] Date of Patent: Sep. 14, 1999

[54] COMPUTER MEMORY SYSTEM HAVING PROGRAMMABLE OPERATIONAL CHARACTERISTICS BASED ON CHARACTERISTICS OF A CENTRAL PROCESSOR

[75] Inventors: Edward C. King, Fremont, Calif.; Forrest O. Arnold, Springboro, Ohio; Jackson L. Ellis, Fort Collins, Colo.; Robert B. Moussavi, San Diego, Calif.; Pirmin L. Weisser, Unterkirnach, Germany; Fulps V. Vermeer, Delft, Netherlands

[73] Assignee: NCR Corporation, Dayton, Ohio

[21] Appl. No.: 08/132,421

[22] Filed: Oct. 5, 1993

Related U.S. Application Data

[63] Continuation of application No. 07/563,214, Aug. 6, 1990, abandoned.

[51] Int. Cl.[6] .................. G06F 13/00

[52] U.S. Cl. .................. 711/118; 711/123; 711/125; 711/126

[58] Field of Search .................. 364/200 MS, 900 MS; 395/400 MS, 425 MS

[56] References Cited

U.S. PATENT DOCUMENTS

| | | | |
|---|---|---|---|
| 4,622,631 | 11/1986 | Frank et al. | 364/200 |
| 4,648,030 | 3/1987 | Bomba et al. | 395/425 |
| 4,719,568 | 1/1988 | Carrubba et al. | 364/200 |
| 4,783,736 | 11/1988 | Ziegler et al. | 395/425 |
| 4,884,197 | 11/1989 | Sachs et al. | 395/425 |
| 4,888,679 | 12/1989 | Fossum et al. | 395/800 |
| 4,914,577 | 4/1990 | Stewart et al. | 364/200 |
| 4,926,317 | 5/1990 | Wallach et al. | 364/200 |
| 5,023,776 | 6/1991 | Gregor | 364/200 |
| 5,043,870 | 8/1991 | Ditzel et al. | 395/425 |
| 5,055,999 | 10/1991 | Frank et al. | 395/425 |
| 5,073,969 | 12/1991 | Shoemaker | 364/200 |
| 5,283,868 | 2/1994 | Baker et al. | 364/200 |

OTHER PUBLICATIONS

Computer Design, Jul. 1, 1990, pp. 78–90; Wilson: "Will the search for the ideal memory architecture ever end?".

*Primary Examiner*—David L. Robertson
*Attorney, Agent, or Firm*—Douglas S. Foote; George H. Gates

[57] ABSTRACT

A computer memory system connectable to a processor and having programmable operational characteristics based on characteristics of the processor. The memory system includes several caches and a main memory connected to a bus. One cache can be programmed to store only code data. Another cache can be programmed to buffer data writes to the main memory only from the processor. The main memory supports fast page mode and can be programmed to selectively reopen either code or non-code data pages.

9 Claims, 2 Drawing Sheets

Microfiche Appendix Included
(3 Microfiche, 263 Pages)

10
CACHE CONTROLLER
INTERNAL CACHE
16
PRE - FETCH CACHE
18
WRITE BUFFER CACHE
20
BURST CONTROL
BURST ADDRESS
DRAM
12
DRAM CONTROLLER
22
ADDRESS
DATA
CONTROL
BUS INTERFACE
14

COMPUTER MEMORY SYSTEM HAVING PROGRAMMABLE OPERATIONAL CHARACTERISTICS BASED ON CHARACTERISTICS OF A CENTRAL PROCESSOR

This is a continuation of application Ser. No. 07/563,214 filed on Aug. 6, 1990, now abandoned.

The present invention relates to computer memory systems. More particularly, it relates to memory systems which are designed to reduce memory access time.

CROSS-REFERENCE TO RELATED APPLICATIONS

"Computer Memory System", U.S. patent application Ser. No. 563,216, filed concurrently herewith, invented by Edward C. King, Jackson L. Ellis, Robert B. Moussavi and Pirmin L. Weisser.

"Computer Memory Open Page Bias Method and System", U.S. patent application Ser. No. 563,221, filed concurrently herewith, invented by Edward C. King and F. Vincentinus Vermeer.

"Data Prefetch Method and System", U.S. patent application Ser. No. 563,215, filed concurrently herewith, invented by Pirmin L. Weisser, F. Vincentinus Vermeer and Edward C. King.

"Method for Merging Data in A Computer Memory System", U.S. patent application Ser. No. 563,219, filed concurrently herewith, invented by Edward C. King, Forrest O. Arnold, Jackson L. Ellis, Robert B. Moussavi, Pirmin L. Weisser and F. Vincentinus Vermeer.

"Computer Memory System and Method for Cleaning Data Elements", U.S. patent application Ser. No. 563,217, filed concurrently herewith, invented by Jackson L. Ellis.

"Mapped Cache Structure and Method", U.S. patent application Ser. No. 563,218, filed concurrently herewith, invented by Robert B. Moussavi and Jackson L. Ellis.

"Computer Memory System and Method for Enhancing Performance on Cache Overflows", U.S. patent application Ser. No. 563,220, filed concurrently herewith, invented by Jackson L. Ellis, Robert B. Moussavi and Edward C. King.

REFERENCE TO A MICROFICHE APPENDIX

A microfiche appendix is provided herewith. The appendix includes three microfiche having a combined total of 263 frames.

BACKGROUND OF THE INVENTION

The performance of a computer system can be enhanced by the use of a memory hierarchy. For example, a three tiered memory can be constructed from low, medium, and high speed memories. A low speed memory may be a magnetic disk for low cost, bulk storage of data. A medium speed memory may be constructed from Dynamic Random Access Memories (DRAMs) for use as the computer system's main memory. A high speed memory may employ SRAMs for use as a processor cache memory. The theory behind memory hierarchy is to group code (instructions) and other data to be executed by the system processor in the highest speed memory. Since high speed memory is typically the most expensive memory available, economics dictate that it be relatively small. Main memory consisting of DRAMs is denser and less expensive than a cache memory with SRAMs, and can therefore be significantly larger than the cache memory.

During operation, instructions and other data are transferred from system memory to the cache memory in order to have quick access to the variables of the currently executing program. As additional data, not in the cache, is required, such data is transferred from the main memory by replacing selected data in the cache. Various replacement algorithms are utilized to determine which data is replaced.

By definition, an efficiently operating cache architecture is one which exhibits a high ratio of "hits" to accesses. A "hit" occurs when data requested is in the cache. A number of factors influence the hit ratio. The dominate factor is the locality of reference of the code being executed. In other words, if the code is located in proximate physical locations in memory, the hit ratio will be higher than if the code is widely distributed throughout memory. Another factor influencing the hit ratio of a cache is the number of devices having access to the memory. If only a single bus master, such as the system processor, has access to the memory, the data stored in the cache can be controlled to achieve a reasonably high hit ratio. However, when more than a single bus master has access to the memory through the same cache, the cache can bounce back and forth between requests from the bus masters, greatly reducing the hit ratio. In other words, the cache is non-discriminatory, with the demands of the system processor and other bus masters affecting the cache equally. One operation can significantly impact the data make-up of the cache. For example, data cached in response to memory accesses from a non-host CPU bus master will overwrite data needed by the host processor.

Another factor affecting the hit ratio relates to the fact that both code and non-code data are cached. Blocks of data in the system memory are mapped into different physical locations in the cache. If each block of data in system memory may be mapped to only a single location, the cache is known as a direct mapped cache. Set associative mapping involves each block of data being mapped to more than a single location. For example, if each block of data may be mapped to either of two locations, the cache is known as two-way set associative. Irrespective of the number of locations available for a system memory block, when both code and non-code data are being cached, there will be overlap in their respective mappings. Thus, when both code and non-code data are cached, there can be significant thrashing which takes place as data is replaced in response to memory accesses.

In the past, most computer systems have been optimally designed on the basis of the particular type of host processor selected. A few computer systems have been designed with the flexibility of being assembled with more than a single type of processor. In the later case, the operational characteristics of the associated subsystems frequently represent a compromise based on the various characteristics of the candidate host processors. Alternatively, the subsystems may be optimally designed based on the characteristics of a particular host processor type, with a less efficient system resulting when other than the optimal processor is employed.

OBJECTS OF THE INVENTION

It is therefore an object of the present invention to provide a new and improved high performance computer memory system.

It is another object of the present invention to provide a memory system having programmable operational characteristics based on characteristics of the host processor.

It is a further object of the present invention to provide a memory system which is efficiently operable with different types of host processors.

It is yet another object of the present invention to provide a memory system having one or more caches whose operational characteristics are based on the host processor type.

It is yet a further object of the present invention to provide a memory system having a DRAM memory with a bias towards automatically opening certain pages as a function of the host processor type.

SUMMARY OF THE INVENTION

The present invention is a computer memory system connectable to a processor and having programmable operational characteristics based on characteristics of the processor.

In a more detailed form, the memory system includes a plurality of caches and a main memory connected to a bus. The processor and another bus master are also connected to the bus. A programmable characteristic of a first of the caches is whether or not it holds only code data. A second of the caches buffers data writes to the main memory, and a programmable characteristic of the second cache is whether or not it buffers data solely from the bus master.

DESCRIPTION OF A PREFERRED EMBODIMENT

Figure 1:
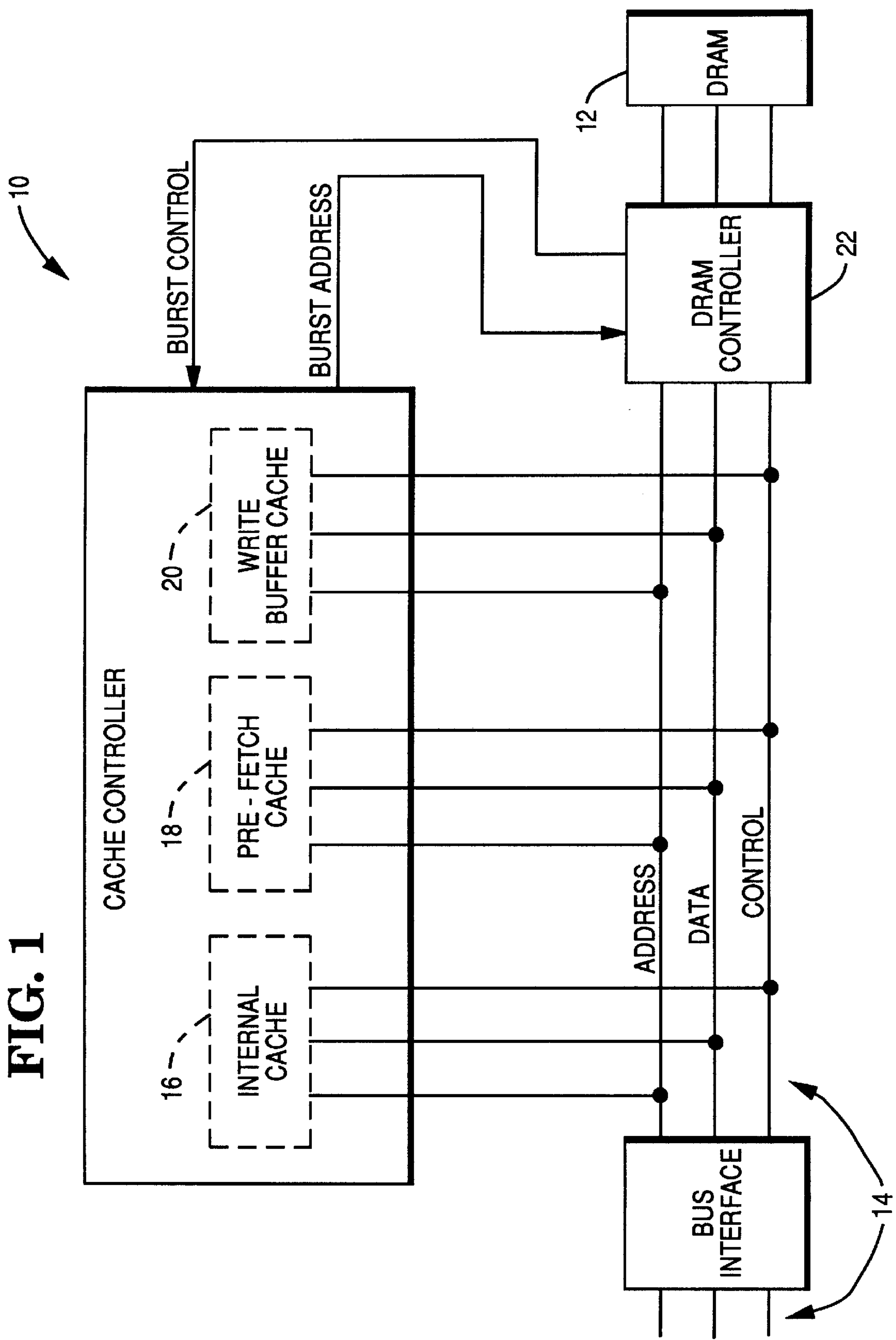
FIG. 1 is a block diagram of a high performance computer memory system according to one form of the present invention.

FIG. 1 shows a block diagram of a computer memory system 10. System 10 includes a system memory 12 which in a preferred embodiment consists of dynamic random access memory (DRAM) chips. The data stored in memory 12 can be generally divided into code data (instructions) and non-code data. As used herein, the term "data" refers to information and includes both code data (instructions) and non-code data. Memory 12 is connected to other parts of a computer system (not shown) by a bus 14. Memory system 10 is designed for use with two or more bus masters, although it is operable with a single master. More particularly, it is designed for use with a host processor such as an Intel processor 386, 386sx or 486 in combination with other bus masters or devices which will compete with the host processor for access to memory system 10. Access to DRAM 12 is controlled by DRAM controller 22 which is located within bus 14.

Memory system 10 also includes an internal cache 16, a pre-fetch cache 18 and a write buffer cache 20, each connected to bus 14. In a preferred form, internal cache 16 is a 4K byte, four-way set associative cache, pre-fetch cache 18 is a 128 byte, direct-mapped cache, and write buffer cache 20 is a 128 byte, two-way set associative cache.

An important feature of the present invention is that the functionality of the various caches may be varied depending upon the host processor type (386, 386sx or 486) utilized. Memory system 10 has programmable operational characteristics based on characteristics of the processor. However, certain features of the caches do not vary. For example, internal cache 16 holds data which is selected solely on the basis of memory accesses by the host processor. In other words, internal cache 16 is dedicated to the host processor and will not be affected by memory accesses by other bus masters. It will be appreciated that each of the caches is readable by any of the bus masters. Thus, even though cache 16 will not allow data writes therein based on memory accesses by other than the system processor, it will be read by another bus master if requested data happens to reside therein. It will further be appreciated that each of the caches snoops (observes) any data writes not intended for it in order to invalidate its contents upon snoop hits, thereby ensuring coherency.

Another immutable feature of the caches is that pre-fetch cache 18 contains solely code data pre-fetched from DRAM 12. Furthermore, it only pre-fetches code based on a memory access by the host processor. In operation, whenever the system processor requests code data not already in the pre-fetch cache, the next sequential 128 bytes of code are pre-fetched into cache 18 as a queue in anticipation of subsequent requests for code.

Write buffer cache 20 only buffers data to be written into DRAM 12. It is not merely a write buffer, but is a cache which, as mentioned above, can be read by any bus master. However, it will not cache data from DRAM 12.

An important feature of the present invention is the separation of the functionality of each of the caches and the selective definition of those functions based on the processor type. By this insight, the present system is able to achieve or exceed the performance of a system utilizing a cache many times larger than the cumulative size of the subject caches. With respect to the selective definition of function based on processor type, each cache exhibits operational characteristics which are programmable as a function of characteristics based on processor type. For example, one programmable characteristic of internal cache 16 is whether it holds only code data. For a system employing a 386 or 386sx system processor, internal cache 16 holds only code data, whereas for a system employing a 486 processor, internal cache 16 holds both code and non-code data. A programmable characteristic of write buffer cache 20 is whether or not it buffers data solely from a bus master other than the system processor. For a system employing a 486 system processor, write buffer cache 20 buffers data writes by any bus master other than the system processor. Whereas, for a system employing a 386 or 386sx system processor, write buffer cache 20 buffers data writes by any bus master including the system processor. The operational characteristics of the caches are defined through self configuration at power-on time based on information relating to the type of host processor present.

DRAM controller 22 supports fast page mode for accesses to DRAM 12. Fast page mode is a well known technique for speeding up accesses to DRAM by activating a row line in a memory page and then strobing sequential column lines to transfer data into or out of DRAM. A page is opened when the row line is activated. In the present invention, DRAM 12 is divided into pages which contain either code or non-code data. A register 40 associated with DRAM 12 is located either in DRAM 12 or DRAM controller 22 and holds the page address of a most recently accessed page. In effect, the system provides a bias towards code pages or non-code pages depending upon the type of processor connected to the system. The type of data (code or non-code) for which the main memory 12 through controller 22 provides a bias, is another programmable characteristic of the present invention. For example, if the system processor is a 486, the address of the most recently accessed code address page is held in the register 40. In operation, both code and non-code data pages in DRAM 12 can be randomly accessed. If a code page is accessed on one cycle and a non-code page is accessed on the next cycle, the address of the code page is held in a register 40 while the non-code page is accessed.

Immediately after the non-code page access, the address in the register 40 is used to reopen the code page. The term "reopen" means to activate a row line of the subject page. In contrast, if the system processor is a 386 or 386 sx, the address of the most recently accessed non-code address page is held in the register 40. The combination of selective open page bias, fast page mode accesses and multiple caches provides increased system performance.

Write buffer cache 20 is a two-way set associative cache. The non-code data region of memory may be divided into three areas known as list, heap and stack. Data blocks in memory are reserved for the list, heap and stack, each of which has its own organization and purpose. For example, a stack is a set of data elements, only one of which can be accessed at a time. The list data is primarily read and generally not written to. In structured programs, a high percentage of writes occur to the stack with the second most data writes occurring to the heap. By proper assignment of the heap and stack data blocks in DRAM and mapping respective blocks to opposing sets in the two-way set associative cache, increased operational efficiency can be realized. Furthermore, an open page bias in the DRAM for non-code data will effectively be an open page bias for list data. In this manner, operational efficiency of the subject invention is further enhanced.

A significant advantage of the dual or multiple mode operation of the present invention is that it allows different types of processors to be installed with the subject memory system without significantly compromising their individual performance. One feature which is not programmable is the dedication of internal cache 16, which is the largest of the caches (4K Byte), to the host processor. Since the majority of memory operations come from the host processor, this allows the efficiency of the host processor to be maximized. Moreover, in a 386/486 Microchannel environment, the other bus masters can utilize the streaming mode to improve their performance, an option not available to the system processor. As discussed previously, a programmable feature of internal cache 16 is whether or not it holds only code data. Because a 386 processor has no cache internal to itself, internal cache 16 is dedicated to code data—the primary type of data accessed by the 386 processor from memory. On the other hand, a 486 processor has its own internal cache and also has the ability to burst-read code data from prefetch cache 18 or from the DRAM 12 open page. Thus, for a 486 host processor, internal cache 16 is dedicated primarily to non-code data.

Again, as discussed previously, a programmable feature of write buffer cache 20 is whether it buffers data solely from bus masters other than the host processor. For a 386 host processor, cache 20 buffers data writes from both the 386 and other bus masters. It buffers 386 data writes since internal cache 16 is dedicated solely to code, and it buffers data writes from other bus masters since internal cache 16 is dedicated solely to the 386. For a 486 host processor, cache 20 is dedicated solely to the other bus masters since internal cache 16 handles code and non-code data solely for the 486 host processor.

The programmable operational characteristic of DRAM 12, whether the open page bias is for code or non-code data, is closely associated with the programmable characteristics of internal cache 16 and write buffer cache 20. For example, since the 486 can burst read code data, DRAM 12 is provided with an open page bias for code data. This also allows prefetch cache 18 to operate efficiently as internal cache 16 does not assist greatly with code data in this mode. In contrast, with a 386 processor, the open page bias for non-code data balances internal cache 16 which holds only code data.

The detail design of the present invention is captured in CDL, a high level hardware description language. CDL is a software tool which unambiguously defines the hardware for a digital logic system. The CDL listing completely defines a preferred embodiment of computer memory system 10. The listing may be compiled to generate a "C" source code which may then be compiled by a C compiler to generate a standardized C Object File Format (COFF). The COFF is then input to a logic synthesis program to provide a detailed logic schematic. A logic synthesis program which may be used for this purpose is SYNOPSYS, available from Synopsys Inc., Mountain View, Calif.

Figure 2:
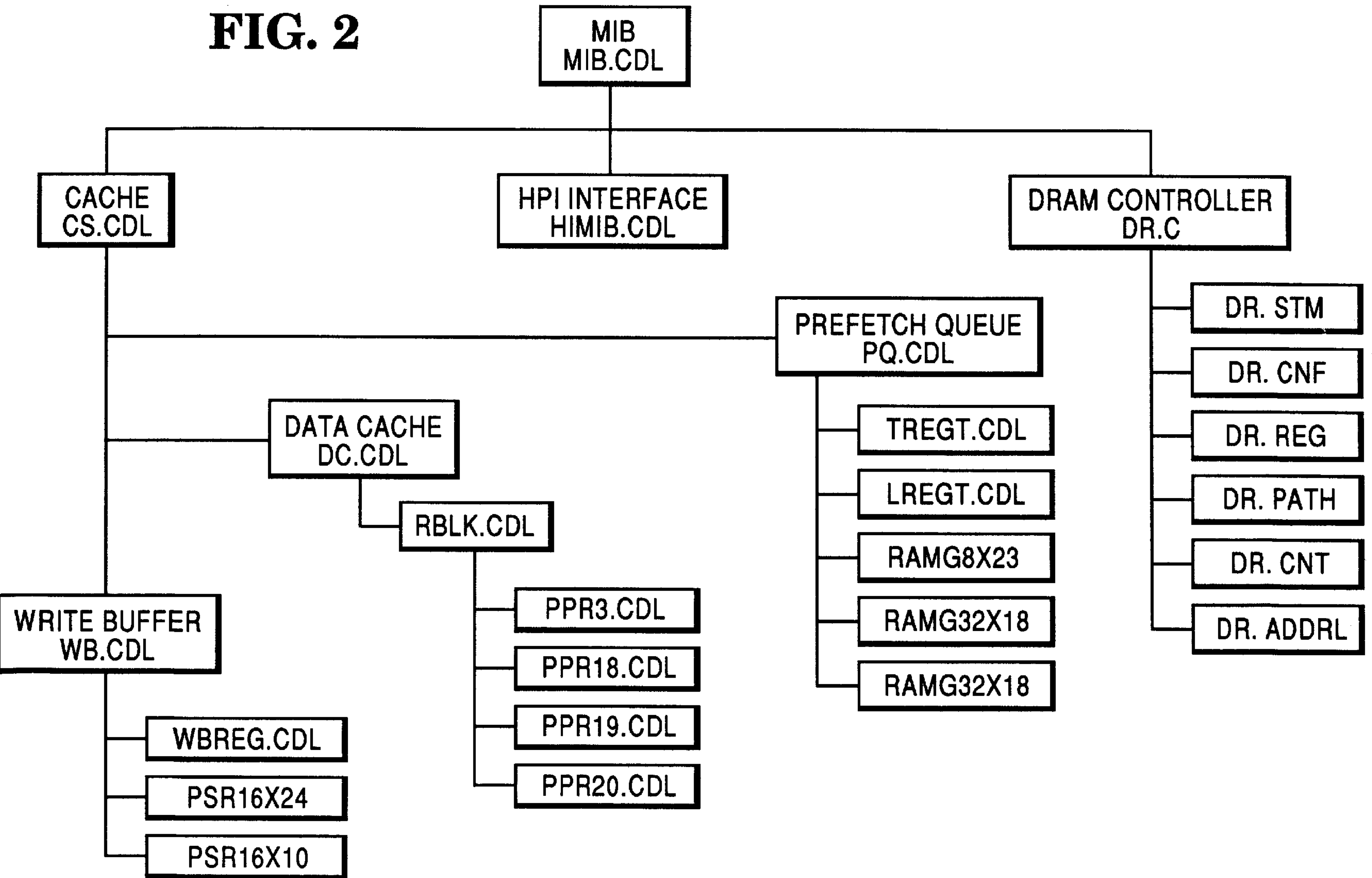
FIG. 2 is a block diagram showing the relationship between modules of the memory system.

FIG. 2 shows the relationship between the modules of the present invention. The structure and mode of operation of each of these modules is defined by the CDL listing, provided herewith as a microfiche appendix.

It will be clear to those skilled in the art that the present invention is not limited to the specific embodiment disclosed and illustrated herein. Nor is the invention limited to applications employing 386, 386sx or 486 processors.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A computer memory system connectable to a processor and having one or more programmable operational characteristics, said characteristics being defined through configuration by said computer based on the type of said processor, wherein said system is connectable to said processor by a bus, said system comprising:

a main memory connected to said bus; and a cache connected to said bus;

wherein a programmable operational characteristic of said system determines a type of data stored by said cache.

2. The system of claim 1 wherein a programmable operational characteristic of said system determines whether said cache stores only code data or whether said cache stores both code data and non-code data.

3. The system of claim 1 wherein a bus master is also connectable to said bus so that both said processor and bus master have access to said memory system, wherein said cache performs buffering of data writes to said main memory, and wherein a programmable operational characteristic of said system determines whether said cache performs buffering of data solely from said bus master or whether said cache performs buffering of data both from said bus master and said processor.

4. The system of claim 1 further comprising:

one or more additional caches connected to said bus;

wherein a programmable operational characteristic of said system determines a source of data received by at least one of said additional caches.

5. The system of claim 4 wherein a bus master is also connectable to said bus so that both said processor and bus master have access to said memory system, wherein a first programmable operational characteristic of said system determines whether said cache stores only code data or whether said first cache stores both non-code data and code data, wherein one of the additional caches performs buffering of data writes to said main memory, and wherein a second programmable operational characteristic of said system determines whether said one of the additional caches performs buffering of data solely from said bus master or whether said one of the additional caches performs buffering of data both from said bus master and said processor.

6. A computer memory system connectable to a processor and having one or more programmable operational characteristics, said characteristics being defined through configuration by said computer based on the type of said processor comprising:

a main memory, connected to said processor by a bus, including a plurality of pages of a first type and a plurality of pages of a second type; and a register connected to said memory for holding a page address of a most recently accessed one of said first type pages;

wherein said page address is used to reopen the most recently accessed one of said first type pages after one of said second type pages has been accessed; and wherein a programmable operational characteristic of said system determines a type of data stored in said main memory.

7. The system of claim 6 wherein a programmable operational characteristic of said system determines a type of data stored in said first and second type pages; and wherein the type of data includes code and non-code data.

8. A computer memory system, connectable to a processor and bus master by a bus and having programmable operational characteristics based on characteristics of said processor, comprising:

a plurality of caches connected to said bus;

a main memory connected to said bus and including a plurality of pages of a first and second type; and a register connected to said memory for holding the page address of the most recently accessed of said first type pages;

wherein a first programmable characteristic of said system determines whether a first of said caches stores only code data or whether said first of said caches stores both non-code data and code data;

wherein a second of said caches performs buffering of data writes to said main memory, and a second programmable characteristic of said system determines whether said second of said caches performs buffering of data solely from said bus master and whether said second of said caches performs buffering of data both from said bus master and said processor;

wherein said page address is used to reopen a most recently accessed of said first type pages after one of said second type pages has been accessed; and wherein a third programmable operational characteristic of said system determines a type of data stored by said main memory.

9. The system of claim 8 wherein a programmable operational characteristic of said system determines a type of data stored said first and second type pages; and wherein the type of data includes code and non-code data.

* * * * *